(12) United States Patent
Kawasaki et al.

(10) Patent No.: US 7,070,118 B2
(45) Date of Patent: Jul. 4, 2006

(54) VEHICLE COOLING DEVICE

(75) Inventors: Yukio Kawasaki, Kariya (JP);
Toshitaka Suzuki, Kiyose (JP)

(73) Assignees: Aisin Seiki Kabushiki Kaisha, Kariya (JP); Nippon Thermostat Co. Ltd, Kiyose (JP)

( * ) Notice: Subject to any disclaimer, the term of this patent is extended or adjusted under 35 U.S.C. 154(b) by 294 days.

(21) Appl. No.: 10/786,589

(22) Filed: Feb. 26, 2004

(65) Prior Publication Data

US 2004/0169090 A1 Sep. 2, 2004

(30) Foreign Application Priority Data

Feb. 28, 2003 (JP) ............................. 2003-052599

(51) Int. Cl.
*G05D 23/02* (2006.01)
*G05D 23/00* (2006.01)
*F01P 7/14* (2006.01)

(52) U.S. Cl. ................ 236/101 C; 236/93 R; 236/101 R; 123/41.08; 123/41.1

(58) Field of Classification Search ............ 236/101 R, 236/101 C, 93 R, 34, 34.5; 123/41.08, 41.09, 123/41.1; 62/196.4; 137/468
See application file for complete search history.

(56) References Cited

U.S. PATENT DOCUMENTS 6,499,442 B1 * 12/2002 Hollis ...................... 123/41.1
6,592,046 B1 * 7/2003 Suda ......................... 236/34.5

FOREIGN PATENT DOCUMENTS

| JP | 60-131625 | 9/1985 |
| JP | 62-85777 | 6/1987 |
| JP | 2001317355 A | * 11/2001 |

* cited by examiner

*Primary Examiner*—Chen Wen Jiang
(74) *Attorney, Agent, or Firm*—Buchanan Ingersoll PC (57) ABSTRACT

A vehicle cooling device for radiating the heat using a refrigerant includes a main valve for controlling a flow distribution of the refrigerant distributed to a radiator and to at least one of conduits among conduits where the refrigerant flows bypassing the radiator in accordance with a valve opening degree, a thermo element for varying the valve opening degree in accordance with the temperature of the refrigerant, the thermo element including a temperature sensing portion, a water pump for circulating the refrigerant via the main valve, the water pump including an inlet, a radiator conduit provided downstream of the radiator, the inlet of the water pump and the radiator conduit arranged being opposite to each other along an operational direction of the main valve, and the temperature sensing portion of the thermo element positioned at the inlet side of the water pump relative to the main valve.

15 Claims, 6 Drawing Sheets

FIG. 6                   Prior Art

VEHICLE COOLING DEVICE This application is based on and claims priority under 35 U.S.C. § 119 with respect to Japanese Patent Application No. 2003-052599 filed on Feb. 28, 2003, the entire contents of which are incorporated herein by reference.

FIELD OF THE INVENTION

The present invention relates to a vehicle cooling device. More particularly, the present invention pertains to a vehicle cooling device including a main valve for distributing a refrigerant flow to each conduit where the refrigerant flows bypassing a radiator and a conduit for the radiator and including a water pump.

BACKGROUND OF THE INVENTION

Figure 5:
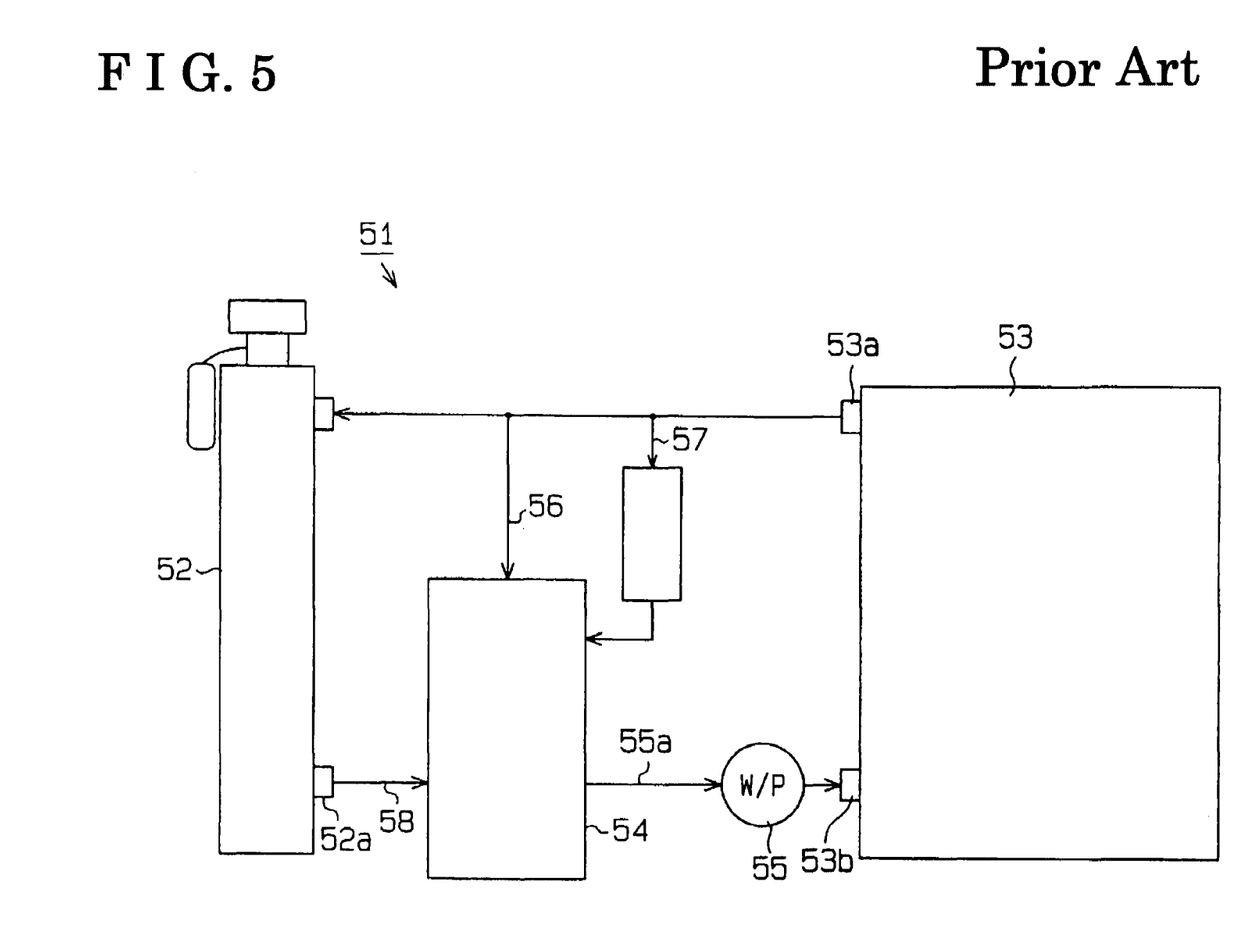
FIG. 5 is a systematic view of a known engine cooling device.

A known vehicle cooling device is shown in FIG. 5. As shown in FIG. 5, a vehicle cooling device 51 includes a water pump 55 for discharging the cooling water to an engine 53 side and a thermostat 54 for controlling the valve opening in accordance with the temperature of the cooling water. The vehicle cooling device 51 maintains the water temperature of the engine 53 at a predetermined temperature by the thermostat 54 for controlling the flow volume balance of the cooling water passing through the radiator 52 and the cooling water directly provided from the engine 53.

Figure 6:
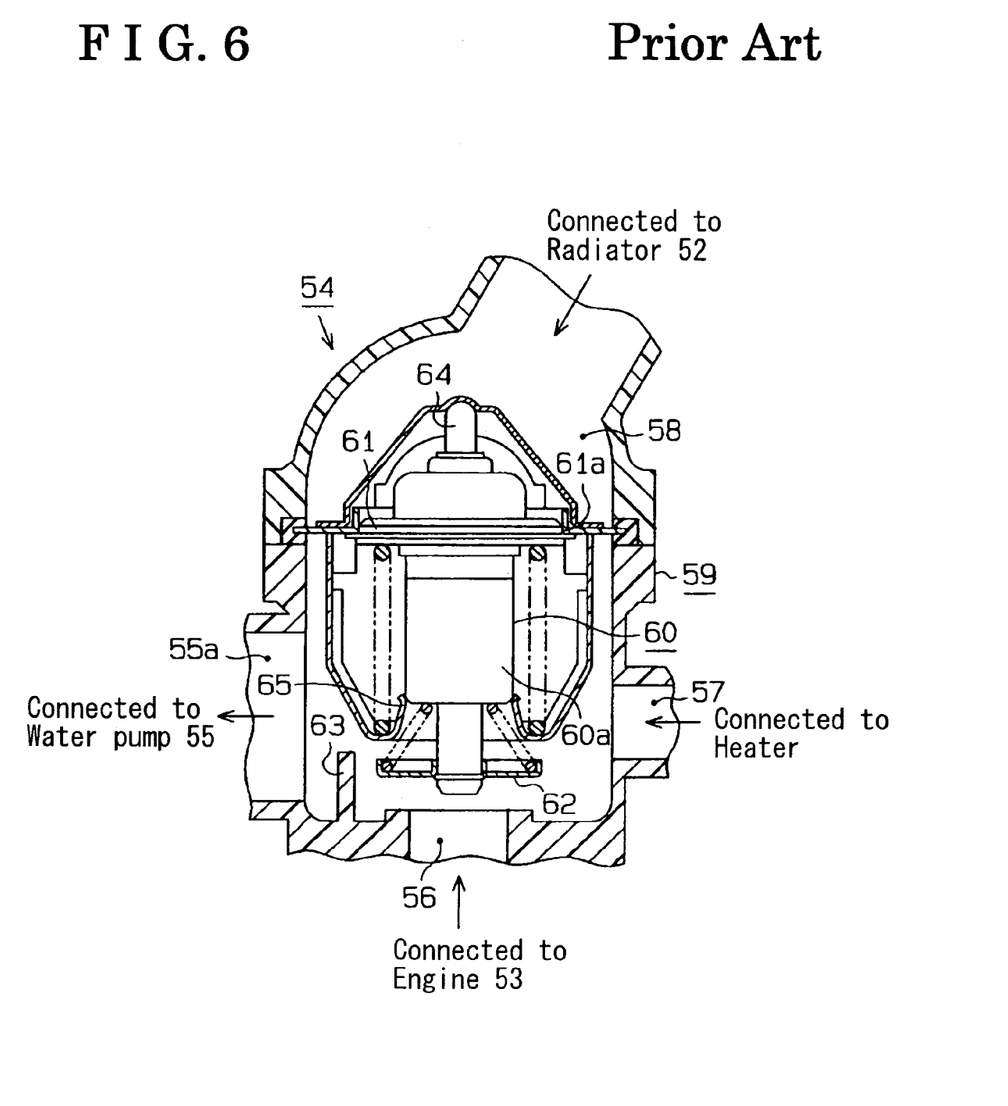
FIG. 6 is a front cross-sectional view of the known thermostat.

As shown in FIG. 6, a housing 59 of the thermostat 54 includes a first conduit 58 where the cooling water from a radiator outlet 52a of the radiator 52 flows. An intake passage 55a of the water pump 55 and a second conduit 56 where the cooling water from the engine outlet 53a of the engine 53 flows are connected to the thermostat 54. The housing 59 accommodates a water temperature sensing portion 60a of a thermo element 60. The thermo element 60 is attached with a main valve 61 and a bypass valve 62. The main valve 61 and the bypass valve 62 control the opening and closing of the first conduit 58 and the second conduit 56.

According to the construction of known vehicle cooling devices described in Japanese Utility Patent Laid-Open Publication No. S60-131625 and Japanese Utility Patent Laid-Open Publication No. S62-85777, a flow directing wall 63 for directing and introducing the cooling water from the second conduit 56 to the water temperature sensing portion 60a is formed between the second conduit 56 and the intake passage 55a in the housing 59. Thus, the cooling water from the second conduit 56 mixed with the cooling water from a heater conduit 57 and the first conduit 58 contacts the water temperature sensing portion 60a before flowing to the water pump 55 side, and the water temperature of the cooling water can be controlled precisely by the thermostat 54.

The thermostat 54 with the foregoing construction supplies the cooling water from the radiator 52 to the engine 53 via the first conduit 58. Because the cooling water is at the low temperature at the engine start, the cooling water returns to the engine 53 via the heater conduit 57 and the water pump 55. When the cooling water reaches a predetermined temperature after the warming up, the wax in the thermo element 60 expands so that a piston 64 projects. In other words, the piston 64 projects in accordance with the temperature of the cooling water. The valve opening of the main valve 61 increases in accordance with the increase of the projection amount of the piston 64 to open the first conduit 58 and to decrease the valve opening of the bypass valve 62. Accordingly, the cooling water cooled at the radiator 52 flows into the water pump 55 in accordance with the distribution ratio of respective conduits 56–58 by the valve openings of the main valve 61 and the bypass valve 62 to be introduced to the engine inlet 53b of the engine 53. The cooling water derived from the engine 53 is distributed to the radiator 52 (i.e., first conduit 58), the second conduit 56, and the heater conduit 57. When the projection amount of the piston 64 assumes the predetermined value, the second conduit 56 is closed.

Notwithstanding, with the construction of the known vehicle cooling device, a portion of the water pump 55 contacting the intake passage 55a is positioned at an external peripheral portion (i.e., external radial side of the main valve 61) of the housing 59. Thus, the water pressure and the flow force to the intake passage 55a side affects relative to the movable portion including the main valve 61 by the introduction of the cooling water by actuating the water pump 55. Accordingly, the partial wear is generated at a sealing surface 61a of the main valve 61, at a valve supporting portion 65 of the main valve 61, and at an external cylinder portion of the thermo element 60, which makes it difficult to increase the longevity of the thermostat 54.

In case the thermostat 54 with the known construction is used, the flow directing wall 63 is required for controlling the water temperature of the cooling water. However, the flow directing wall 63 blocks the smooth flow of the cooling water, which causes the increase of the water flow resistance in the housing 59. In other words, the mixture of the cooling water from the conduits 56–58 in the housing 59 causes the contradiction between the optimum water temperature controllability and the water flow resistance at the cooling system element characteristic. Accordingly, it is required to direct the cooling water by increasing the driving force of the water pump 55. In addition, in case a portion with large water flow resistance exists at the intake side of the water pump 55, the cavitation is likely to be generated, which declines the durability of the water pump 55.

A need thus exists for a vehicle cooling device which enables to increase the longevity of a thermostat, to reduce the driving force of a water pump, and to increase the durability.

SUMMARY OF THE INVENTION

In light of the foregoing, the present invention provides a vehicle cooling device for radiating the heat using a refrigerant which includes a main valve for controlling a flow distribution of the refrigerant distributed to a radiator and to at least one of conduits among conduits where the refrigerant flows bypassing the radiator in accordance with a valve opening degree, a thermo element for varying the valve opening degree in accordance with the temperature of the refrigerant, the thermo element including a temperature sensing portion, a water pump for circulating the refrigerant via the main valve, the water pump including an inlet, a radiator conduit provided downstream of the radiator, the inlet of the water pump and the radiator conduit arranged being opposite to each other along an operational direction of the main valve, and the temperature sensing portion of the thermo element positioned at the inlet side of the water pump relative to the main valve.

According to another aspect of the present invention, a thermostat includes a main valve for controlling a flow distribution of the refrigerant distributed to a radiator and to at least one of conduits among conduits where the refrigerant flows bypassing the radiator in accordance with a valve opening degree, a thermo element for varying the valve opening degree in accordance with the temperature of the refrigerant, the thermo element including a temperature sensing portion, a housing including the thermo element therein, the housing including an opening end, a radiator conduit provided downstream of the radiator, the opening end of the housing and the radiator conduit arranged being opposite to each other along an operational direction of the main valve via the main valve, and the temperature sensing portion of the thermo element positioned at the opening end side of the housing relative to the main valve.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

One embodiment of the present invention will be explained with reference to the illustrations of the drawing figures.

Figure 1:
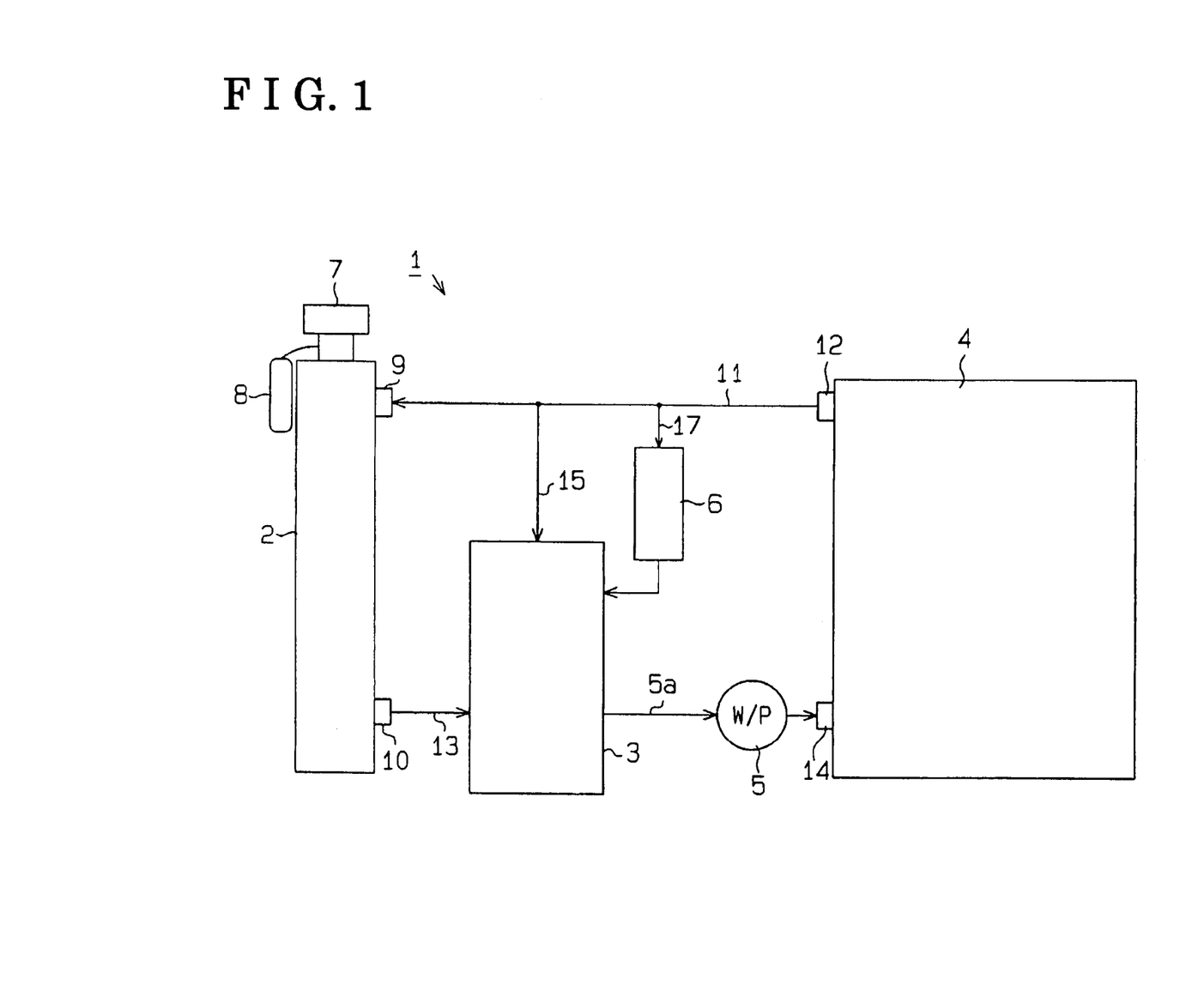
FIG. 1 is a systematic view of an engine cooling device according to an embodiment of the present invention.

As shown in FIG. 1, an engine cooling device 1 serving as a vehicle cooling device includes a radiator 2, a thermostat 3, a mechanical driven type water pump (i.e., referred to as W/P hereafter) 5 driven by an engine 4, and a heater 6 for heating a vehicle chamber. The radiator 2 includes a cooling fan, a radiator cap 7, and a reserve tank 8. The cooling fan sends the air to the radiator 2 to cool down the cooling water serving as the refrigerant in the radiator 2 in order to radiate the heat to the vehicle outside. The radiator cap 7 maintains the pressure of the cooling water flown in the engine cooling device 1 at a predetermined pressure. The reserve tank 8 reserves a part of the cooling water in case the volume of the cooling water is increased by the water temperature change.

The radiator 2 includes a radiator cooling water inlet 9 and a radiator cooling water outlet 10. The radiator cooling water inlet 9 is connected with an engine cooling water outlet 12 provided at the engine 4 via a connection conduit 11. The radiator cooling water outlet 10 is connected to the thermostat 3 via a first conduit 13 serving as a radiator conduit. The cooling water from the radiator cooling water outlet 10 side flows in the first conduit 13. The thermostat 3 is connected to the engine cooling water inlet 14 via the water pump 5.

The thermostat 3 is connected to the engine cooling water outlet 12 of the engine 4 via the connection conduit 11 and a second conduit 15 serving as a conduit bypassed from the connection conduit 11. The thermostat 3 is connected to the engine cooling water outlet 12 via the connection conduit 11 and a heater conduit 17 serving as the conduit bypassed from the connection conduit 11. The heater 6 is provided at the heater conduit 17. The cooling water from the engine cooling water outlet 12 side flows into the second conduit 15 and the heater conduit 17.

The water pump 5 is positioned between a downstream side of the thermostat 3 and the engine cooling water inlet 14 of the engine 4. The cooling water in the engine cooling device 1 is circulated by the water pump 5. Thus, when the engine 4 is driven, the cooling water always flows into the heater 6 to heat the vehicle chamber by the thermal exchange when the cooling water passes through the heater 6.

The thermostat 3 controls the water flow distribution of the first conduit 13, the second conduit 15, and the heater conduit 17 in accordance with the temperature of the engine cooling water. With the construction of the embodiment of the present invention, the engine cooling device 1 controls the distribution of the cooling water by sensing the water temperature at the engine inlet.

Figure 2:
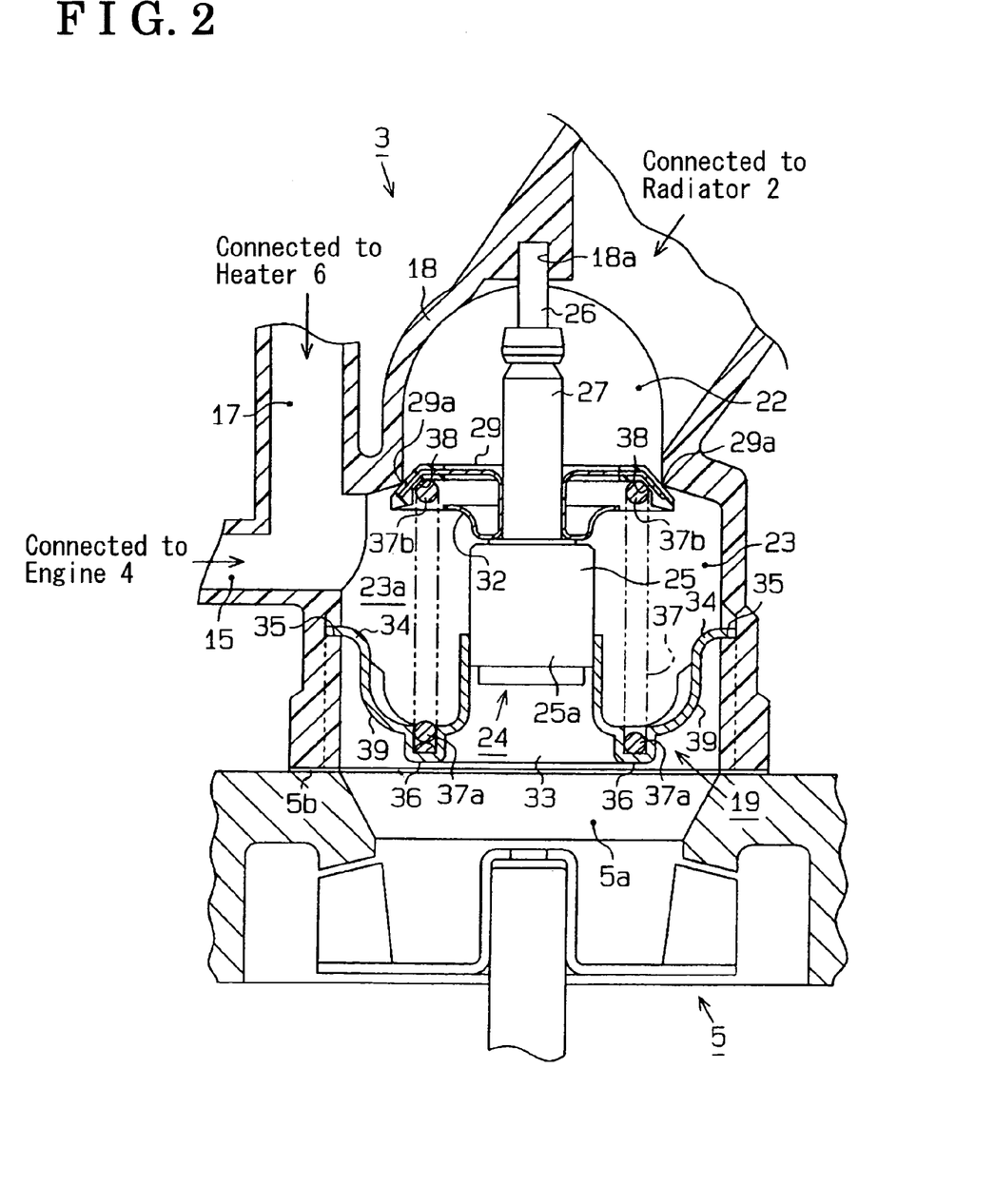
FIG. 2 is a front cross-sectional view of a thermostat according to the embodiment of the present invention.

As shown in FIG. 2, the thermostat 3 includes a housing 18 and a valve driving portion 19. The housing 18 is made of synthetic resin such as high thermal resistance plastic including the melting point higher than the temperature of the cooling water heated by the engine 4. The housing 18 may be made of metal, or the like.

The housing 18 includes a main conduit 22 in communication with the first conduit 13. The main conduit 22 introduces the cooling water introduced from the radiator cooling water outlet 10 side of the radiator 2 to a fluid chamber 23 behind the main valve at the downstream of a main valve 29. The housing 18 is connected with the second conduit 15 and the heater conduit 17. The second conduit 15 and the heater conduit 17 introduce the cooling water introduced from the engine cooling water outlet 12 side of the engine 4 to the fluid chamber 23 behind the main valve.

The second conduit 15 and the heater conduit 17 merge with the main conduit 22 at a merging portion 23a of the fluid chamber 23 behind the main valve. Open ends of the second conduit 15 and the heater conduit 17 are positioned at the merging portion 23a. Thus, the cooling water from the second conduit 15, the heater conduit 17, and the main conduit 22 are mixed at the merging portion 23a. The cooling water introduced to the merging portion 23a is outputted to the engine 4 side via the water pump 5. The fluid chamber 23 behind the main valve is a portion enclosed with an internal peripheral surface of the housing 18 and an external peripheral portion of a thermo element 24. The merging portion 23a is a portion of the fluid chamber 23 behind the main valve in a peripheral direction.

An intake passage 5a serving as an inlet of the water pump 5 is connected to a downstream side open end of the housing 18 via a gasket 5b. The intake passage 5a is in communication with the fluid chamber 23 behind the main valve. The intake passage 5a is positioned in the moving direction of the piston 26. In other words, the intake passage 5a is positioned opposite to the main conduit 22 along the operational direction of the main valve 29. The intake passage 5a is positioned coaxial with the main conduit 22 at the housing 18.

The thermo element 24 of the valve drive portion 19 includes a cylindrical water temperature sensing portion 25 serving as a sensing portion. The water temperature sensing portion 25 is positioned in the fluid chamber 23 behind the main valve, in other words, at the intake passage 5a side relative to the main valve 29. The water temperature sensing portion 25 is slidably supported by a flame 33 engaged with the housing 18. The wax is accommodated in the water temperature sensing portion 25. The wax expands and contracts in accordance with the temperature of the cooling water contacting the water temperature sensing portion 25.

The thermo element 24 includes a stick shaped piston 26 projecting and retracting relative to a cylindrical guiding portion 27. A tip end portion of the guiding portion 27 and the piston 26 are positioned in the main conduit 22. The tip end portion of the piston 26 is fitted in a fitting concave portion 18*a* formed at an internal side surface of the housing 18. The piston 26 projects from the guiding portion 27 by the expansion of the wax and retracts in the guiding portion 27 by the contraction of the wax. Thus, the guiding portion 27 moves to the intake passage 5*a* side of the water pump 5 at the projecting of the piston 26 and to move to the main conduit 22 side at the retracting of the piston 26.

The circular main valve 29 is provided at a base end of the guiding portion 27. The main valve 29 is provided at a communication portion between the fluid chamber 23 behind the main valve and the main conduit 22 to be unitarily fixed to the guiding portion 27. The main valve 29 blocks the main conduit 22 at the closed state shown in FIG. 2. The main valve 29 allows the introduction of the cooling water from the main conduit 22 to the fluid chamber 23 behind the main valve at an open state shown in FIG. 4.

As shown in FIG. 2, a flow directing portion 32 serving as a second flow directing mechanism is formed at a metal plate reinforcing the main valve 29. The flow directing portion 32 is configured to be circular viewing from the moving direction of the piston 26. The flow directing portion 32 is shaped in arc to have a convex configuration towards the main valve 29 side. The flow directing portion 32 allows the cooling water introduced to the external peripheral surface 25*a* at the water temperature sensing portion 25 to merge the cooling water flown at the merging portion 23*a* and at a clearance between the main valve 29 and the housing 18 by directing the cooling water introduced to the external peripheral surface 25*a* along the flow directing portion 32.

Figure 3:
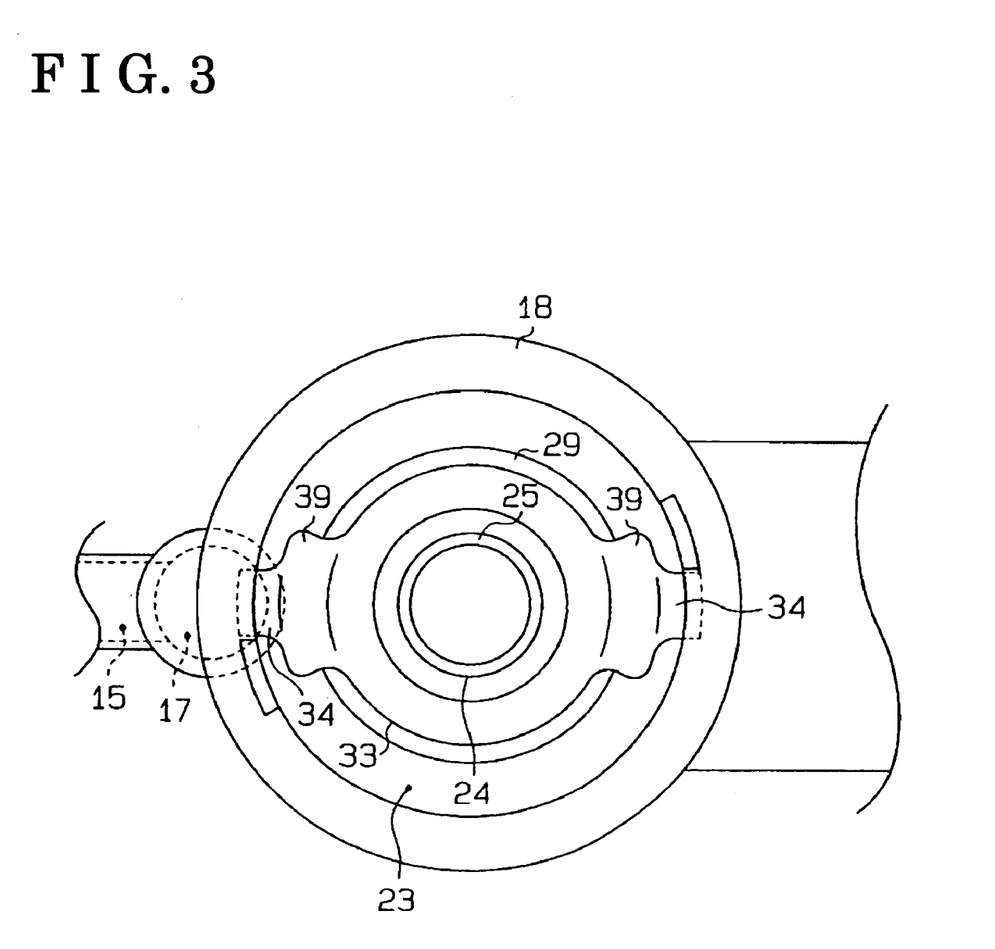
FIG. 3 is a bottom surface view of the thermostat according to the embodiment of the present invention.

The water temperature sensing portion 25 is slidably supported by the flame 33 serving as a supporting member, a housing member, and a spring supporting member. The flame 33 is positioned at the downstream of the main valve 29. As shown in FIG. 3, the flame 33 is configured to be approximately circular viewing from the moving direction of the piston 26. A pair of engagement pieces 34 is formed at the external periphery of the flame 33. Each engagement piece 34 is positioned at opposite side from each other relative to the flame 33. One of the engagement piece 34 is positioned at the downstream side of the merging portion 23*a* in the peripheral direction of the housing 18. As shown in FIG. 2, each engagement piece 34 is engaged at an engagement concave portion 35 formed at an internal side surface of the housing 18 at the fluid chamber 23 behind the main valve. Each engagement piece 34 is engaged at the downstream side relative to the corresponding engagement concave portion 35. The portion of the flame 33 where the engagement piece 34 is positioned in the peripheral direction is formed in approximately U shape at the cross section viewing from the radial direction of the flame 33 and includes the convex configuration towards the intake passage 5*a* of the water pump 5.

A coil end accommodating portion 36 including the U shape in cross-section is formed at the flame 33. The coil end accommodating portion 36 is positioned coaxial with the water temperature sensing portion 25 to be extended in the peripheral direction of the flame 33. A coil end 37*a* formed at first end portion of a return spring 37 serving as a spring is accommodated in the coil end accommodating portion 36.

A second end of the return spring 37 is engaged with a coil end accommodating portion 38 formed at the main valve 29. The coil end 37*b* formed at the second end of the return spring 37 is positioned in the coil end accommodating portion 38, as shown in FIG. 2, so that the coil end 37*b* does not block the flow of the cooling water from the flow directing portion 32 to the fluid chamber 23 behind the main valve and the merging portion 23*a*. The winding density of the coil at the coil ends 37*a*, 37*b* of the return spring 37 assumes higher than the winding density of the coil at the central portion of the return spring 37. The, coil ends 37*a*, 37*b* of the return spring 37 do not contribute to the spring constant. The return spring 37 biases the flame 33 and the main valve 29 to be separated from each other. Because the flame 33 is engaged with the engagement concave portion 35, the piston 26 is retracted into the guiding portion 27 by the biasing force of the return spring 37 at the contraction of the wax to close the main valve 29.

As shown in FIG. 3, a pair of flow directing portions 39 serving as a first flow directing mechanism is provided at an external peripheral portion of the flame 33. Each flow directing portion 39 is positioned between the engagement piece 34 and the coil end accommodating portion 36. The flow directing portion 39 is configured to have wider width than the engagement piece 34. As shown in FIG. 2, the flow directing portion 39 includes the arc configuration to have the convex configuration towards the downstream side. One of the flow directing portions 39 is positioned at the downstream side of the merging portion 23*a* in the peripheral direction of the housing 18. The flow directing portion 39 directs a part of the cooling water flown in the merging portion 23*a* along the flow directing portion 39 to flow approximate to the coil end accommodating portion 36. The cooling water introduced to the approximate to the coil end accommodating portion 36 is directed to the upstream side along an internal peripheral portion of the flame 33 to be introduced to the external peripheral surface 25*a* of the water temperature sensing portion 25. Thereafter, the cooling water introduced to the external peripheral surface 25*a* merges into the cooling water flown at the merging portion 23*a* and at the clearance between the main valve 29 and the housing 18 by the flow directing portion 32 of the main valve 29. Thus, the cooling water directed by the flame 33 and the flow directing portion 32 assumes the tumble flow flown through the internal side surface of the housing 18, the engagement piece 34, the flow directing portion 39, the external peripheral surface 25*a* of the water temperature sensing portion 25, and the flow directing portion 32 in order. The cooling water which is not introduced to the flow directing portion 39 is introduced to the intake conduit 5*a* of the water pump 5.

The flame 33 is configured to resolve the drawbacks of the known vehicle cooling device. The thermostat 3 optimizes the temperature of the cooling water by mixing the cooling water from the second conduit 15, the heater conduit 17, and the main conduit 22. Because the cooling water is at the low temperature at the start of the engine 4, the cooling water passing through the engine 4 cycles at the second conduit 15 and the heater conduit 17 when the water pump 5 is actuated. In this case, the cooling water from the second conduit 15 and the heater conduit 17 is mixed at the merging portion 23*a*. A portion of the mixed cooling water is directed to the external peripheral surface 25*a* of the water temperature sensing portion 25 by the flow directing portion 39 via the flame 33 so that the water temperature sensing portion 25 senses the temperature. In this case, the cooling water does not flow to the first conduit 13 and the radiator 2 because the main valve 29 of the thermostat 3 is closed.

Figure 4:
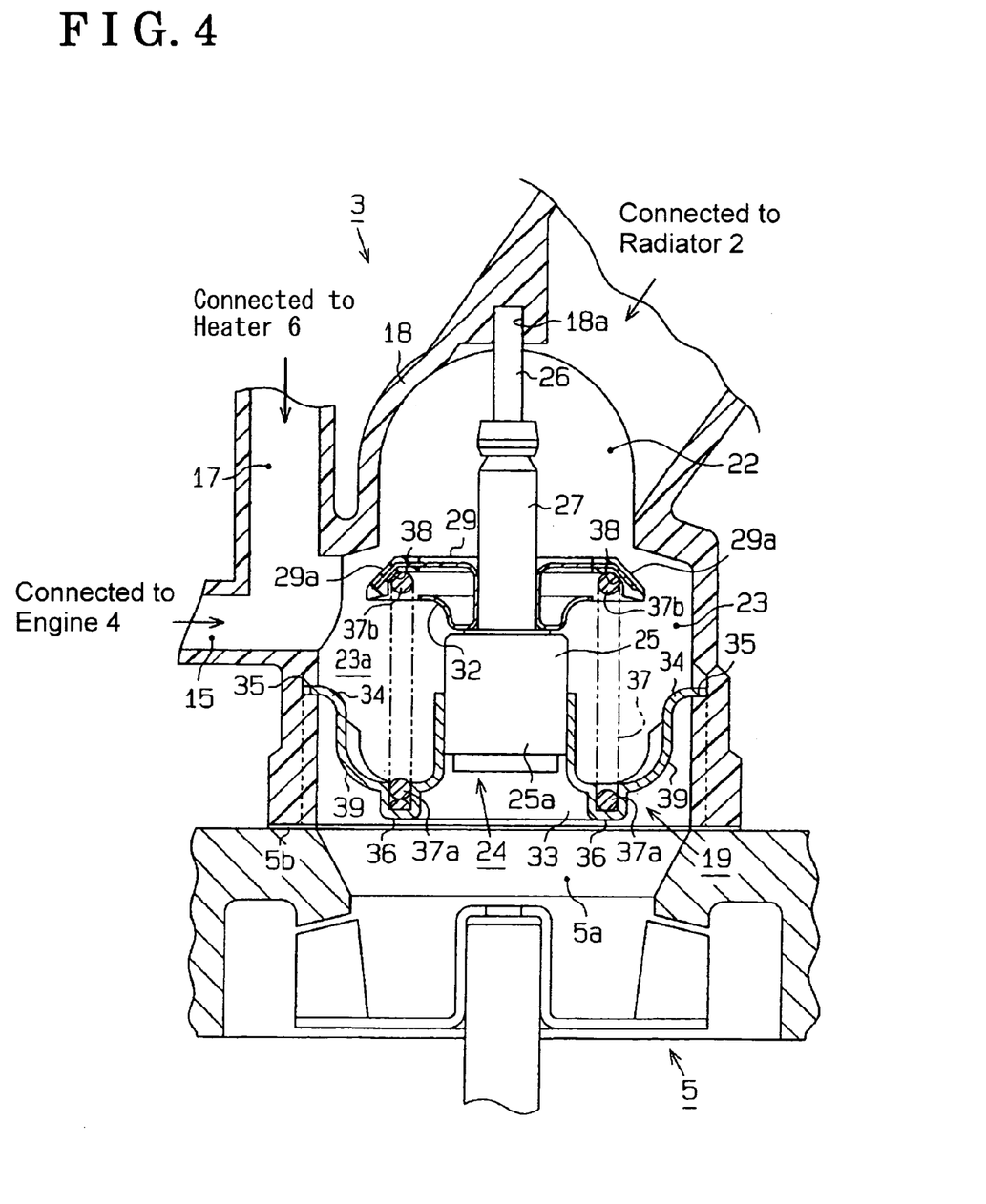
FIG. 4 is a front cross-sectional view of the embodiment of the present invention.

As the temperature of the engine cooling water increases and the cooling water introduced to the external peripheral surface 25a of the water temperature sensing portion 25 assumes to be approximate to the cooling water control temperature, the wax in the water temperature sensing portion 25 expands so that the piston 26 of the thermo element 24 projects in accordance with the temperature to open the main valve 29 as shown in FIG. 4. In this case, the cooling water from the main conduit 22 flows along the moving direction of the piston 26 at the external periphery portion of the return spring 37 to be mixed with the cooling water from the second conduit 15 and the heater conduit 17 at the merging portion 23a. A portion of the mixed cooling water is introduced to the external peripheral surface 25a of the water temperature sensing portion 25 by the flow directing portion 39 via the flame 33 to be sensed at the water temperature sensing portion 25. The water flow amount of the cooling water passing through the first conduit 13 and the radiator 2 is gradually increased in accordance with the increase of the valve opening of the main valve 29 due to the increase of the projecting amount of the piston 26. Accordingly, the cooling water passing through the engine 4 cycles the first conduit 13 in addition to the second conduit 15 and the heater conduit 17.

Thus, the cooling water flows to the radiator 2 and the cooling water passing through the radiator 2 is cooled down by the air sent due to the vehicle speed and the air sent from the cooling fan. In this case, the distributional proportion of the water flow amount of the cooling water flowing at the first conduit 13, the second conduit 15, and the heater conduit 17 is varied in accordance with the valve opening of the main valve 29. More particularly, the water flow amount of the cooling water passing through the first condtuin 13 and the radiator 2 is gradually increased in accordance with the increase of the valve opening of the main valve 29 due to the decrease of the water flow resistance of the first conduit 13.

According to the embodiments of the present invention, the following effects can be obtained.

Because the intake passage 5a of the water pump 5 and the main conduit 22 are arranged opposite to each other along the operational direction of the main valve 29 at the housing 18, the water pressure and the flow force affects along the operational direction of the movable portion including the main valve 29 when the cooling water is introduced by actuating the water pump 5. Thus, the pressure of the cooling water is equalized at the circumferential direction of the main valve 29. Accordingly, the generation of the partial wear at each member of the thermostat 3 can be prevented. For example, the generation of the partial wear at the internal side surface of the guiding portion 27, at the sealing surface 29a of the main valve 29, and at the engagement piece 34 of the flame 33 can be prevented. This elongates the longevity of the thermostat 3.

According to the embodiment of the present invention, the flow distribution of the cooling water is approximately equalized in the circumferential direction of the main valve 29 so that most of the cooling water is arranged to be flown as the axial flow flowing at the external peripheral portion of the return spring 37. Thus, the water flow resistance of the cooling water flown in the housing 18 can be further decreased.

A part of the cooling water flown in the merging portion 23a is introduced to the external peripheral surface 25a of the water temperature sensing portion 25 by the flow directing portion 39 via the flame 33. Thus, the thermo element 24 securely detects the temperature change of the cooling water outputted from the engine 4 without the known flow directing wall 63 to precisely control the water temperature of the cooling water by the engine cooling device 1.

According to the embodiment of the present invention, because the cooling water flows without blocking by the known flow directing wall 63 or the like, the water flow resistance in the housing 18 assumes small. Thus, the water pump 5 with small driving force can be used.

Further, with the construction of the embodiment of the present invention, because the generation of the cavitations at the intake passage 5a side can be prevented by the reduction of the water flow resistance at the upstream side of the water pump 5, the reduction of the driving force and the increase of the duration of the water pump 5 can be achieved.

According to the embodiment of the present invention, the second conduit 15 and the heater conduit 17 are in communication with the merging portion 23a. Thus, the cooling water from the second conduit 15 and the heater conduit 17 is likely to be flown to the fluid chamber 23 behind the main valve. Thus, the mixed cooling water is likely to be directed to the external peripheral surface 25a of the water temperature sensing portion 25 from the flow directing portion 39 to precisely detect the temperature change of the cooling water by the thermo element 24.

According to the embodiment of the present invention, the cooling water introduced to the external peripheral surface 25a of the water temperature sensing portion 25, the heater conduit 17, and the second conduit 15 is flown to the merging portion 23a having the low pressure by the jet effect due to the high speed flow of the cooling water from the main conduit 22 to the merging portion 23a. A part of the cooling water is reintroduced to the external peripheral surface 25a of the water temperature sensing portion 25. Thus, the tumble flow of the cooling water introduced to the external peripheral surface 25a of the water temperatures sensing portion 25 is promoted. Accordingly, the size of the flame 33 and the flow directing portion 39 can be reduced. In addition, because the cooling water from the second conduit 15, the heater conduit 17, and the flow directing portion 32 can be mixed in a small space and the limited time utilizing the height of the flow speed of the cooling water from the main conduit 22, the size reduction is achieved and the water temperature control can be precisely achieved.

According to the embodiment of the present invention, opening ends of the second conduit 15 and the heater conduit 17 are positioned at the merging portion 23a. Thus, the pressure at the merging portion 23a is reduced as the flow speed of the cooling water flown from the main conduit 22 is increased in accordance with the increase of opening of the main valve 29, the cooling water flown in the second conduit 15 and the heater conduit 17 is compulsorily sucked to the merging portion 23a having the low pressure by the jet effect. Because the water flow amount of the cooling water flowing in the merging potion 23a is further increased to be faster, the cooling water introduced to the external peripheral surface 25a of the water temperature sensing portion 25 is flown to the merging portion 23a with low pressure via the flow directing portion 32 of the main valve 29. Thereafter, a part of the cooling water is reintroduced to the external peripheral surface 25a of the water temperature sensing portion 25. Accordingly, the tumble flow of the cooling water introduced to the external peripheral surface 25a of the water temperature sensing portion 25 can be further accelerated.

According to the construction of the embodiment of the present invention, because the flame 33 used for maintaining the return spring 37 between the main valve 29 functions for introducing the cooling water to the external peripheral surface 25a of the water temperature sensing portion 25, it is not required to provide additional parts for introducing the cooling water besides the flame 33. Thus, the number of the parts for the thermostat 3 is reduced to reduce the manufacturing cost for the thermostat 3.

According to the construction of the embodiment of the present invention, because the coil ends 37a, 37b of the return spring 37 having higher winding density of the coil than the winding density of the coil at the central portion are accommodated in the coil ends 36, 38, the tumble flow of the cooling water introduced to the external peripheral surface 25a of the water temperature sensing portion 25 is unlikely blocked by the return spring 37. Thus, the water flow resistance of the tumble flow is reduced for securely introducing the cooling water of the necessary water flow amount to the external peripheral surface 25a of the water temperature sensing portion 25.

With the construction of the embodiment of the present invention, the flow directing portion 32 of the main valve 29 allows the cooling water introduced to the external peripheral surface 25a of the water temperature sensing portion 25 to merge into the cooling water flown at the merging portion 23a. Accordingly, the water flow flowing at the second flow directing portion increases by the dynamic pressure effect of the cooling water flowing at the merging portion 23a. Thus, the tumble flow of the cooling water introduced to the external peripheral surface 25a of the water temperature sensing portion 25 can be further accelerated. Accordingly, the cooling water is introduced to the external peripheral surface 25a of the water temperature sensing portion 25 by using the flow directing portion 32 to reduce the size of the flame 33.

With the construction of the embodiment of the present invention, by determining the configuration of the flow directing portion 32 so that the cooling water directed from the external peripheral surface 25a of the water temperature sensing portion 25 to the merging portion 23a and the cooling water flown at the merging portion 23a do not conflict one another, the generation of the pressure loss and the turbulence at the flow of the cooling water can be prevented.

With the construction of the embodiment of the present invention, because one of the engagement piece 34 formed at the flame 33 is positioned at the downstream side of the merging portion 23a in the peripheral direction of the housing 18, one of the directing portion 39 is also positioned at the downstream side of the merging portion 23a in the peripheral direction of the housing 18. Thus, the cooling water flown at the merging portion 23a is likely to be introduced to the flame 33. Thus, the cooling water is likely to be introduced from the flame 33 to the external peripheral surface 25a of the water temperature sensing portion 25, and the temperature change of the cooling water can be more precisely detected by the thermo element 24.

According to the embodiment of the present invention, because the flow directing portion 32 and the main valve 29 are unitarily formed, the positioning space of the flow directing portion 32 in the housing 18 is reduced. Thus, the size of the thermostat 3 can be reduced.

According to the construction of the embodiment of the present invention, because the known bypass valve 62 provided at the known vehicle cooling device is not required, the intake passage 5a of the water pump 5 can be positioned approximate to the downstream side of the main valve 29. Thus, the size of the thermostat 3 can be further reduced.

Although the flow directing portion 39 is provided at the portion of the flame 33 in the foregoing embodiment, in place of the flow directing portion 39, a flow directing wall for directing the cooling water to the external peripheral surface 25a of the water temperature sensing portion 25 may be formed at an internal side surface of the housing 18. Further, the flame 33 may be divided into a supporting member for supporting the water temperature sensing portion 25 and a spring supporting member for supporting the return spring 37. The flow directing portion 39 may be formed either at the supporting member or the spring supporting member. The flame 33 formed with the flow directing portion 39 may be unitarily formed with the water temperature sensing portion 25.

Although the second conduit 15 and the heater conduits 17 are in communication with the merging portion 23a in the foregoing embodiment, one of the second conduit 15 or the heater conduit 17 may be in communication with the merging portion 23a.

The flow directing portion 32 may be arranged separated from the main valve 29. The flow directing portion 32 may be formed at the internal side surface of the housing 18. The flow directing portion 32 may be omitted.

Although the mechanical driven type engine 4 is used for the water pump 5 in the foregoing embodiment, the electric type water pump driven by a motor may be used.

Although the thermo element 24 senses the temperature of the engine inlet water temperature in the foregoing embodiment, the temperature of other portions such as at the engine outlet water temperature may be sensed.

Although the cooling water is used as the refrigerant in the foregoing embodiment, the oil, or the like, with the low viscosity may be used as the refrigerant.

According to the embodiment of the present invention, the longevity of the thermostat, the driving force reduction of the water pump, and the size reduction of the cooling system and the increase of the duration can be achieved.

According to the embodiment of the present invention, because the inlet of the water pump and the radiator conduit are arranged to be opposed to each other along the operational direction of the main valve, the water pressure and the flow force are applied along the operational direction of the movable portion including the main valve when the refrigerant is introduced by actuating the water pump. As a result, the generation of the partial wear at each member of the thermostat included in the vehicle cooling device can be prevented to increase the longevity of the thermostat.

According to the embodiment of the present invention, a part of the refrigerant flown in the fluid chamber behind the main valve is directed to the external peripheral surface of the temperature sensing portion by the first flow directing mechanism. Thus, the thermo element securely detects the temperature change of the refrigerant for controlling the water temperature of the refrigerant by the vehicle cooling device.

According to the embodiment of the present invention, the part of the refrigerant is reintroduced to the external peripheral surface of the temperature sensing portion by the high speed flow of the refrigerant from the radiator conduit to the fluid chamber behind the main valve to flow the refrigerant introduced to the external periphery of the temperature sensing portion to the fluid chamber behind the main valve with the low pressure. Thus, the flow of the refrigerant introduced to the external peripheral surface of the temperature sensing portion can be further promoted. Accordingly, because the refrigerant is introduced to the external periphery surface of the temperature sensing portion using the second flow directing mechanism, the size of the first flow directing portion can be reduced.

According to the embodiment of the present invention, because the flow of the refrigerant is not blocked by the flow directing wall or the like, the water flow resistance at the inlet side of the water pump is reduced. Thus, it is not required to direct the refrigerant with larger driving force of the water pump. This prevents the generation of the cavitations at the inlet side of the water pump to reduce the driving force of the water pump and to improve the duration of the water pump.

According to the embodiment of the present invention, because the refrigerant flown from at least one of conduits where the refrigerant flows bypassing the radiator is likely introduced to the external peripheral surface of the temperature sensing portion, the temperature change of the refrigerant can be detected further precisely by the thermo element.

According to the embodiment of the present invention, because the first flow directing mechanism is unitarily formed with at least one of the supporting member, the thermo element, the spring supporting member, and the housing, the number of the parts included in the thermostat can be reduced. Thus, the manufacturing cost of the thermostat can be reduced.

According to the embodiment of the present invention, because the second flow directing mechanism is unitarily formed on at least one of the thermo element, the housing, and the main valve, the arranging space for the second flow directing mechanism in the housing can be reduced. Thus, the size of the thermostat included in the vehicle cooling device can be reduced.

According to the embodiment of the present invention, because the coil ends of the spring having the higher winding density of the coil than the winding density of the coil at the central portion is accommodated in the coil end accommodating portions, the flow of the refrigerant introduced to the external peripheral surface of the temperature sensing portion is unlikely blocked by the spring. Thus, the water flow resistance of the refrigerant can be reduced to further accelerate the flow of the refrigerant introduced to the external peripheral surface of the temperature sensing portion.

According to the construction of the embodiment of the present invention, because the first flow directing mechanism is positioned at the downstream side of the merging portion of the radiator conduit and at least one of the conduits where the refrigerant flows bypassing the radiator in the peripheral direction of the housing having the thermo element therein, the introduction of the refrigerant from the first flow directing mechanism to the external peripheral surface of the temperature sensing portion assumes further easier.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle cooling device for radiating the heat using a refrigerant comprising:
   a main valve for controlling a flow distribution of the refrigerant distributed to a radiator and to at least one of conduits among conduits where the refrigerant flows bypassing the radiator in accordance with a valve opening degree;
   a thermo element for varying the valve opening degree in accordance with the temperature of the refrigerant, the thermo element including a temperature sensing portion;
   a water pump for circulating the refrigerant via the main valve, the water pump including an inlet;
   a radiator conduit provided downstream of the radiator;
   the inlet of the water pump and the radiator conduit arranged being opposite to each other along an operational direction of the main valve; and
   the temperature sensing portion of the thermo element positioned at the inlet side of the water pump relative to the main valve.

2. The vehicle cooling device according to claim 1 further comprising:
   a fluid chamber behind the main valve provided downstream of the main valve; and
   a first flow directing mechanism for directing a part of the refrigerant flown in the fluid chamber behind the main valve to an external peripheral surface of the temperature sensing portion.

3. The vehicle cooling device according to claim 2, wherein the refrigerant flown in the fluid chamber behind the main valve or at the external peripheral surface of the temperature sensing portion is introduced to the inlet of the water pump.

4. The vehicle cooling device according to claim 2, further comprising:
   a housing including the thermo element therein, wherein the housing is connected with the plural conduits where the refrigerant flows bypassing the radiator; and wherein
   at least one of the conduits is in communication with the fluid chamber behind the main valve.

5. The vehicle cooling device according to claim 2, further comprising:
   a supporting member for supporting the temperature sensing portion;
   a housing member provided at the temperature sensing portion;
   a spring for biasing the main valve in a direction for reducing the valve opening degree;
   a spring supporting portion for supporting the spring; and
   a housing including the thermo element therein; wherein
   the first flow directing mechanism is unitarily formed with at least one of the supporting member, the housing member, the spring supporting member, and the housing.

6. The vehicle cooling device according to claim 2, further comprising:
   a spring for biasing the main valve in a direction for reducing the valve opening degree, the spring positioned coaxially with the thermo element on at least one of a member including the first flow directing mechanism and a member including the second flow directing mechanism; and a coil end accommodating portion for accommodating a coil end of the spring.

7. The vehicle cooling device according to claim 2, wherein the first flow directing mechanism is positioned downstream of a merging portion of the radiator conduit and at least one of the conduits where the refrigerant flows bypassing the radiator in a peripheral direction of the housing including the thermo element therein.

8. The vehicle cooling device according to claim 1, further comprising:
a fluid chamber behind the main valve provided downstream of the main valve; and
a second flow directing mechanism for merging the refrigerant introduced along the external peripheral surface of the temperature sensing portion into the refrigerant flown in the fluid chamber behind the main valve.

9. The vehicle cooling device according to claim 8, further comprising:
a housing member provided at the temperature sensing portion;
a housing including the thermo element therein; and wherein
the second flow directing mechanism is formed on at least one of the housing member, the housing, and the main valve.

10. A thermostat comprising:
a main valve for controlling a flow distribution of the refrigerant distributed to a radiator and to at least one of conduits among conduits where the refrigerant flows bypassing the radiator in accordance with a valve opening degree;
a thermo element for varying the valve opening degree in accordance with the temperature of the refrigerant, the thermo element including a temperature sensing portion;
a housing including the thermo element therein, the housing including an opening end;
a radiator conduit provided downstream of the radiator;
the opening end of the housing and the radiator conduit arranged being opposite to each other along an operational direction of the main valve via the main valve; and
the temperature sensing portion of the thermo element positioned at the opening end side of the housing relative to the main valve.

11. The thermostat according to claim 10, further comprising:
a fluid chamber behind the main valve provided downstream of the main valve; and
a first flow directing mechanism for directing a part of the refrigerant flown in the fluid chamber behind the main valve to an external peripheral surface of the temperature sensing portion.

12. The thermostat according to claim 11, further comprising:
a supporting member for supporting the temperature sensing portion;
a housing member provided at the temperature sensing portion;
a spring for biasing the main valve in a direction for reducing the valve opening degree;
a spring supporting member for supporting the spring; and wherein
the first flow directing mechanism is unitarily formed on at least one of the supporting member, the housing member, the spring supporting member, and the housing.

13. The thermostat according to claim 11, further comprising:
a spring for biasing the main valve in a direction for reducing the valve opening degree, the spring positioned coaxially with the thermo element on at least one of a member including the first flow directing mechanism and a member including the second flow directing mechanism; and
a coil end accommodating portion for accommodating a coil end of the spring.

14. The thermostat according to claim 10, further comprising:
a fluid chamber behind the main valve provided downstream of the main valve; and
a second flow directing mechanism for merging the refrigerant directed along the external peripheral surface of the temperature sensing portion into the refrigerant flown in the fluid chamber behind the main valve.

15. The thermostat according to claim 14, further comprising:
a housing member provided at the temperature sensing portion; wherein
the second flow directing mechanism is formed on at least one of the housing member, the housing, and the main valve.

* * * * *